(12) United States Patent
Suhara

(10) Patent No.: US 8,411,123 B2
(45) Date of Patent: Apr. 2, 2013

(54) LIGHT SCANNING APPARATUS, LATENT IMAGE FORMING APPARATUS AND IMAGE FORMING APPARATUS

(75) Inventor: Hiroyuki Suhara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1259 days.

(21) Appl. No.: 12/230,013

(22) Filed: Aug. 21, 2008

(65) Prior Publication Data

US 2009/0051982 A1 Feb. 26, 2009

(30) Foreign Application Priority Data

Aug. 24, 2007 (JP) ................................ 2007-218254

(51) Int. Cl.
*B41J 2/47* (2006.01)
(52) U.S. Cl. ........................................ 347/240; 347/251
(58) Field of Classification Search .................. 347/240, 347/251–254
See application file for complete search history.

(56) References Cited

U.S. PATENT DOCUMENTS

| | | | |
|---|---|---|---|
| 4,572,657 A * | 2/1986 | Amano et al. .................. 355/38 |
| 5,834,766 A | 11/1998 | Suhara |
| 6,081,386 A | 6/2000 | Hayashi et al. |
| 6,376,837 B1 | 4/2002 | Itabashi et al. |
| 6,400,391 B1 | 6/2002 | Suhara et al. |
| 6,532,094 B2 | 3/2003 | Suhara |
| 6,555,810 B1 | 4/2003 | Suhara |
| 6,744,545 B2 | 6/2004 | Suhara et al. |
| 6,870,652 B2 | 3/2005 | Suhara et al. |
| 6,891,678 B2 | 5/2005 | Suhara |
| 6,999,208 B2 | 2/2006 | Suzuki et al. |
| 7,072,127 B2 | 7/2006 | Suhara et al. |
| 7,130,130 B2 | 10/2006 | Suhara |
| 7,345,826 B2 | 3/2008 | Suhara |
| 2005/0162499 A1 | 7/2005 | Sugiyama et al. |
| 2005/0179971 A1 | 8/2005 | Amada et al. |

FOREIGN PATENT DOCUMENTS

| | | | |
|---|---|---|---|
| JP | 04061466 A | * | 2/1992 |
| JP | 2003-182139 | | 7/2003 |
| JP | 2003-241403 | | 8/2003 |
| JP | 2004-77714 | | 3/2004 |
| JP | 2005-212195 | | 8/2005 |
| JP | 2005-212223 | | 8/2005 |
| JP | 2006-133677 | | 5/2006 |
| JP | 2007-078905 | | 3/2007 |
| JP | 2007-196580 | | 8/2007 |
| JP | 2007-196589 | | 8/2007 |
| JP | 2007-199531 | | 8/2007 |

* cited by examiner

*Primary Examiner* — Hai C Pham
(74) *Attorney, Agent, or Firm* — Dickstein Shapiro LLP

(57) ABSTRACT

A light scanning apparatus is provided in which a light source is controlled so that the total exposure energy density of when light beams are emitted to an image carrying member across light deflection scanning of a plurality of times becomes constant on the image carrying member, thereby high image quality, long lasting output images are obtained. Exposure energy density necessary when exposure is completed by light deflection scanning of one time is set to Ex1, the latent image electrical potential deepness of a latent image formed thereof is set to Vs1, total exposure energy density across light deflection scanning of a plurality of times is set to Ex_n, the latent image electrical potential deepness thereof is set to Vs_n, wherein $Ex\_n = Ex1 - \Delta Ex$ and $\{(Vs\_n/Vs1)^3 - 1.05\} \times Ex1 < \Delta Ex < \{(Vs\_n/Vs1)^3 - 0.95\} \times Ex1$.

11 Claims, 13 Drawing Sheets

LD EXPOSURE CONDITION

Vth=−600V

Vth=−750V

LIGHT SCANNING APPARATUS, LATENT IMAGE FORMING APPARATUS AND IMAGE FORMING APPARATUS

PRIORITY CLAIM

This application is based on and claims priority from Japanese Patent Application No. 2007-218254, filed on Aug. 24, 2007, the disclosure of which is incorporated herein by reference in its entirety.

BACKGROUND OF THE INVENTION

1. Field of the Invention

The present invention relates to a light scanning apparatus, in particular, to a light scanning apparatus having a multi beam scanning optical system that simultaneously scans multiple light beams, and also to a latent image forming apparatus and an image forming apparatus which use the light scanning apparatus.

2. Description of the Related Art

Conventionally, a light scanning apparatus is known that performs latent image formation by focusing a light beam emitted from a light source such as a laser diode (LD) or the like to form a latent image on a surface to be scanned of an image carrying member (for example, a photoreceptor having photoconductive properties) via a scanning optical system including a light deflection device (for example, a light deflector of a polygon mirror or the like). The light scanning apparatus is used as a latent image forming device of an image forming apparatus of an electrophotographic system (for example, a digital copier, a laser printer, a laser facsimile, a hybrid machine or the like combining these functions). In addition, as image forming apparatuses gain higher speed and higher density, there is proposed a light scanning apparatus using a multi beam scanning optical system that simultaneously performs writing of multiple lines in a sub scanning direction.

In a photoreceptor used as an image carrying member in an image forming apparatus of an electrophotographic method, even when a total exposure energy density provided to the photoreceptor is the same, there is a phenomenon of reciprocity failure in which the state of latent image formation differs if the relationship between light quantity and exposure time differs. That is, exposure of an insubstantially short time in comparison to exposure taking a comparatively long time has less change in quantity of electrical potentials of the photoreceptor despite the total exposure time being equal and reciprocity failure is generated.

This is because when the light quantity is strong, recohesion quantity of a crier increases so that a quantity of the carrier reaching a surface decreases. And, in the case of a multi-beam scanning optical system, this appears as an image concentration irregularity.

Here, FIG. 9 is an example of using a 4ch LDA (4 channel laser diode array) with 4 LDs from LD1 to LD4 arranged thereby as a scanning optical system of the image forming apparatus. A boundary area of the LD1 and the LD2 is virtually simultaneously exposed so that the area is hit by a strong light quantity in a short period of time. Comparatively, in a boundary area of the LD4 and the LD1, first, the LD4 is exposed. Thereafter the LD1 is exposed so that a time lag is generated and consequently, the area is hit by a weak light quantity in a long period of time. In this case, latent image electrical potential distribution is formed deeply in the exposure with the time lag and a toner becomes easily attachable. As a result, the boundary area between the LD4 and the LD1 has an image concentration thicker than other parts so that an image concentration irregularity is generated.

The phenomenon of reciprocity failure as described above depends, among the property values of a photoreceptor, for example, on the membrane thickness of a charge generation layer (CGL) of an organic photoreceptor, the degree of movement of carrier, the quantum efficiency and the carrier generation quantity. Therefore, it is desirable to provide an image forming system in which reciprocity failure hardly occurs and which is configured to include a photoreceptor and a scanning optical system. But, by a conventional measuring method, a space resolution capability of only about a few millimeters can be obtained so that a precision sufficient for analyzing the mechanism cannot be obtained. Therefore, the most appropriate exposure condition can only be determined from an output image.

Here, as an example of conventional technologies, in JP2004-77714A, a task is set to obtain a high quality image without generating any image quality defection due to reciprocity failure even when multi-beam scanning is performed and it is described that "by adopting jump over scanning, in the case any pair of adjacent scanning line is chosen, a scanning number j of each can be necessarily set to a differing combination so that the time of scan interval can be set to greater or equal to one main scanning time." As a result, image quality defection due to banding by reciprocity failure can be drastically reduced and an image that is hardly recognizable as image quality defection in practical use can be obtained.

With regard to the conventional technologies described in JP2004-77714A, it is recognized that the phenomenon of reciprocity failure influences images, but for the above-described reason, a latent image formation mechanism is not analyzed so that light quantity emitted to a photoreceptor and the specific setting quantity of exposure energy density are not taken into consideration.

SUMMARY OF THE INVENTION

The present invention is made with regard to the above situation and it is an object of the present invention to provide a light scanning apparatus that is able to obtain a high quality, long lasting output image by controlling a light source so that in consideration of the time delay by light scanning and exposure energy, the total exposure energy density at the time light beams are emitted to an image carrying member by light deflection scanning of a plurality of times becomes constant in the image carrying member.

In addition, a second object of the present invention is to provide a latent image forming apparatus that forms a latent image in the image carrying member by using the above described light scanning apparatus to perform multi-beam light scanning.

Furthermore, a third object of the present invention is to provide an image forming apparatus that forms a latent image by performing light scanning against a light-sensitive surface of an image carrying member using the above described light scanning apparatus or latent image forming apparatus and develops the latent image so that it is visualized. A further object of the present invention is to provide a high quality image forming apparatus that adopts an image making system in which reciprocity failure hardly occurs so that image concentration irregularity does not appear.

To accomplish the above objects, a light scanning apparatus according to one embodiment of the present invention lets light beams emitted from a plurality of light sources form an image in an image carrying member as a medium to be scanned via a scanning optical system including a light deflection device, in the case light deflection scanning of a plurality of times is necessary for an exposure quantity emitted to the image carrying member to reach a predetermined exposure quantity, exposure energy density necessary when exposure is completed in light deflection scanning of one time is set as Ex1, latent image electrical potential deepness of an electrostatic latent image formed thereof is set as Vs1 (V), the total exposure energy density when light beams are emitted to an image carrying member across light deflection scanning of a plurality of times is set as Ex_n and latent image electrical potential deepness thereof is set as Vs_n, wherein the total exposure energy density Ex_n when light beams are emitted to the image carrying member across light deflection scanning of a plurality of times is set to satisfy the following conditions for exposure:

$$Ex\_n = Ex1 - \Delta Ex$$

$$\{(Vs\_n/Vs1)^3 - 1.05\} \times Ex1 < \Delta Ex < \{(Vs\_n/Vs1)^3 - 0.95\} \times Ex1$$

DETAILED DESCRIPTION OF THE PREFERRED EMBODIMENTS

Preferred embodiments of the present invention will be explained in detail hereinafter with reference to the accompanying drawings. However, the constituent parts, types, combinations, shapes and the relative positions described by the following embodiments are not thought to be limited to only the scope of the descriptions unless there is specific notation, but are only descriptive examples.

[Embodiment 1]

First, a first embodiment of the present invention is described.

FIG. 1 illustrates a constitutional example of a light scanning apparatus according to the present invention.

Figure 1A:
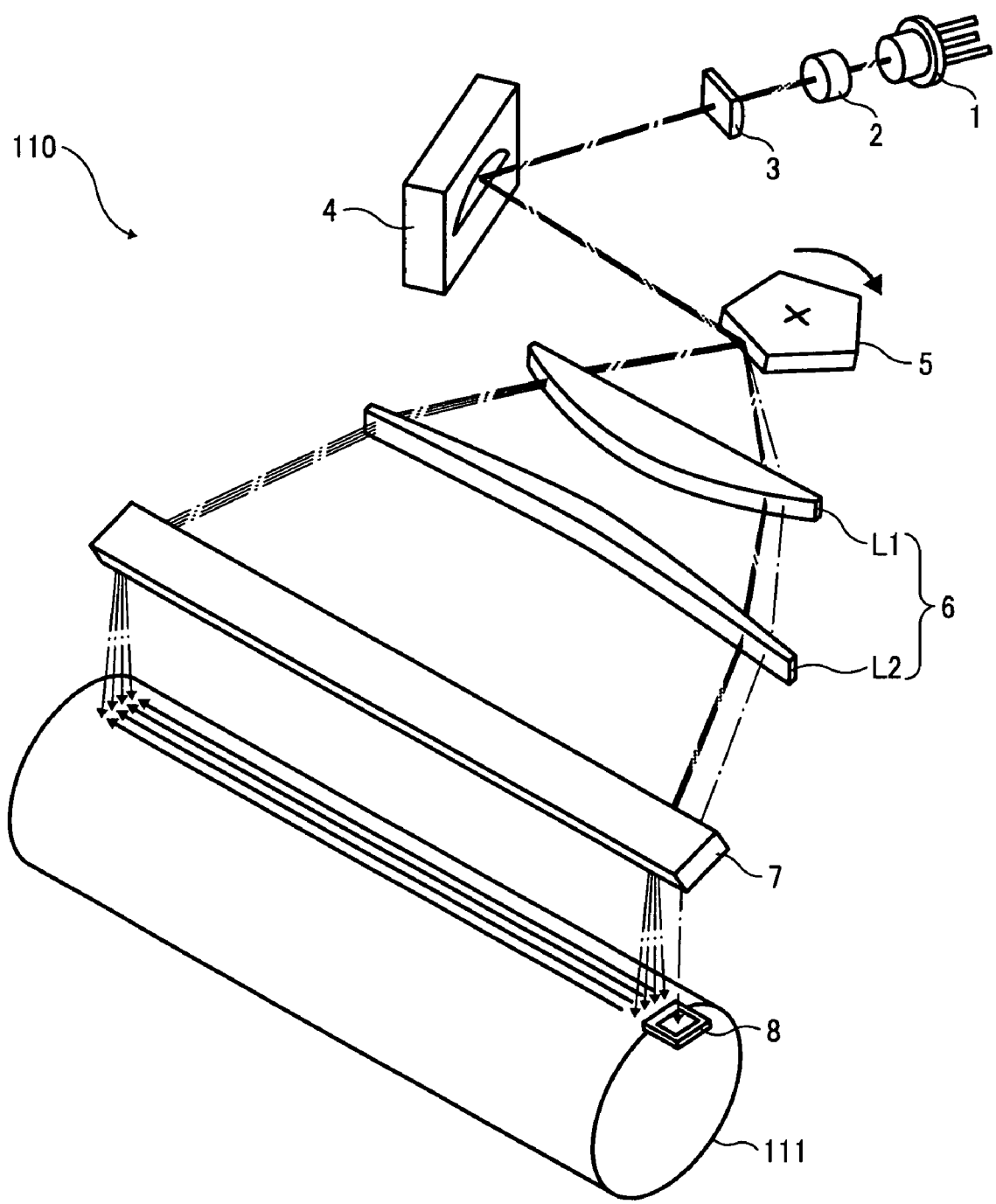
FIG. 1 is a diagram illustrating an example of a constitution of a light scanning apparatus according to the present invention.

As illustrated in FIG. 1A, a light beam emitted from a light source unit 1 including a semiconductor laser is deflected and scanned by a polygon mirror 5 of a polygon scanner as a light deflection device via a collimate lens 2, a cylinder lens 3 and a folding back mirror 4, and forms an image on a photoreceptor 111 as a medium to be scanned by a folding back mirror 7 and a scanning optical system 6 constituted from two scanning lenses L1, L2. Printing data of a portion of 1 line corresponding to each light-generating point are stored in a buffer memory within an image processing apparatus that controls light-generating signals of each light-generating point of the light source unit 1. Then the printing data are read out from each deflecting reflection surface of the polygon mirror 5. Light beams blink on and off in correspondence to printing data on scanning lines on the photoreceptor 111 as a medium to be scanned and electrostatic latent images are formed according to scanning lines. In addition, in a vicinity of a side edge part of the medium to be scanned (photoreceptor) 111 for starting light scanning, a synchronization detector (a light detector constituted from a photodiode or a line sensor of CCD or the like) 8 is disposed for detecting the light beams to be scanned and controlling the timing of the beginning of writing (exposure).

Figure 1B:
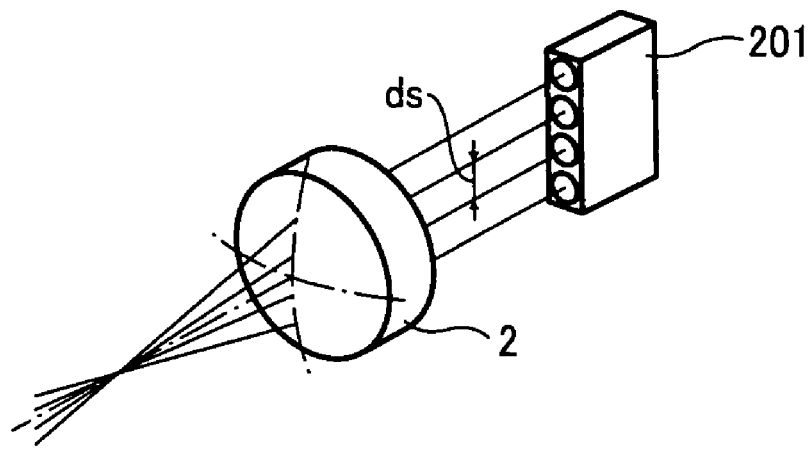

Next, the embodiment illustrated in FIG. 1B is a constitutional example of using a semiconductor laser array (laser diode array (LDA)) 201 in which a light source constituted from 4 semiconductor lasers LD) is arrayed in one line in a sub-scanning direction as a multi-beam light source used for the light source unit 1 of FIG. 1A, where the semiconductor laser array (LDA) 201 is disposed in a vertical direction of a light axis of the collimate lens 2.

Figure 1C:
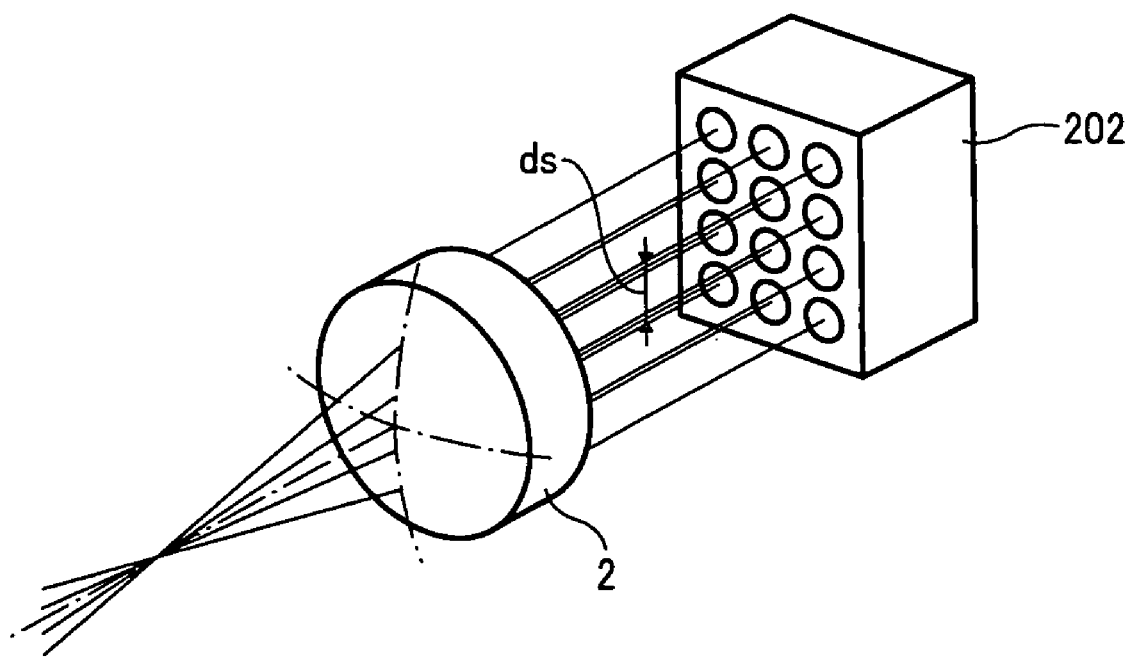

In addition, the embodiment illustrated in FIG. 1C is a constitutional example of a light source part constituted from a surface light-emitting laser 202 in which light-emitting points are disposed in a plane in an x axis direction and a y axis direction hereby used as the multi-beam light source in the light source unit 1 of FIG. 1A. This example uses a surface light-emitting type laser having 3 light-emitting points in the horizontal direction (main scanning direction) and 4 light-emitting points in the vertical direction (sub-scanning direction) for a total of 12 light-emitting points. By applying this constitutional example to the light source unit 1 of a light scanning apparatus 110 illustrated in FIG. 1A, it can be constituted such that one scanning line can be simultaneously scanned by three light sources disposed in the horizontal direction (main scanning direction) and four scanning lines (light sources) disposed in the vertical direction (sub-scanning direction).

In addition, VCSEL (Vertical Cavity Surface Emitting LASER) is known as an example of the surface light-emitting type laser 202 as illustrated in FIG. 1C. Multi-beam lasers such as VCSEL or the like have low power consumption so are useful for saving energy.

Like the constitutional examples shown in FIG. 1B and FIG. 1C, in the case where exposure is performed on the photoreceptor using a plurality of light beams, the phenomenon of reciprocity failure described above appears obviously.

In the case the reciprocity failure comes into effect, it is known that exposure energy density=image plane light quantity per unit area×exposure time so that if the exposure energy density is constant, an electrostatic latent image does not change. However, if the phenomenon of reciprocity failure exists, even image plane light quantity per unit area×exposure time=exposure energy density is constant, under a condition in which the exposure time is long, a latent image diameter and a latent image deepness of the electrostatic latent image differ greatly.

This is because the recohesion amount of carrier increases when the light quantity is strong and the quantity of carrier reaching a surface decreases. Therefore, in order to adjust the image concentration within the same model so that it is uniform, it is necessary to compensate the exposure quantity.

As a method to derive a latent image electrical potential deepness, although a calculation method using electromagnetic field simulation can be used, the actually measured values of an electrostatic latent image can also be used. An example of the calculation method is illustrated hereinbelow.

Figure 10:
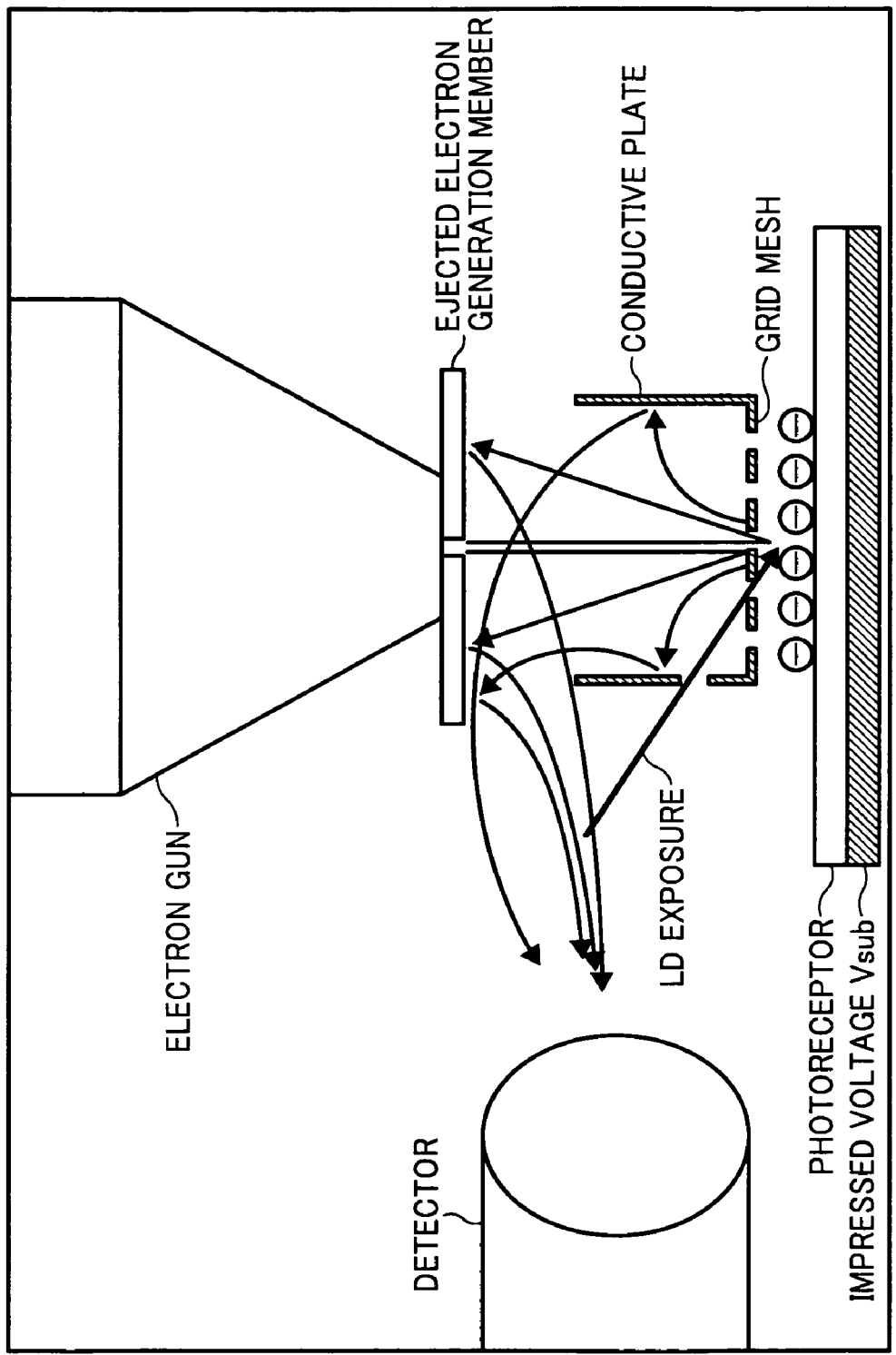
FIG. 10 is a diagram illustrating an example of a constitution of an electrostatic latent image measuring device.

FIG. 10 illustrates an example of a constitution of an electrostatic latent image measuring device including an electron gun that generates electron beams, an ejected electron generation member, a conductive plate, a grid mesh, a LD exposure device, a detector and an under part voltage impression device (not illustrated) and so on. A photoreceptor having a back side electrode is used as a measuring sample, an electrostatic latent image is formed using a device that electrically-charges and exposes the photoreceptor within the measuring device that scans electron beams. By detecting using the detector a reflected electron obtained when voltages are impressed to the back side electrode of the photoreceptor sample, a latent image electrical potential of the sample (photoreceptor) can be measured.

In addition, an electrostatic properties measuring method and a measuring device described in JP2008-170888A as a previous proposal by the inventor of the present invention can be preferably employed as the measuring method and the measuring device of an electrostatic latent image.

FIG. 11 is a diagram (measurement model) illustrating a relationship between incident electrons and the sample (photoreceptor).

Since speed vectors of entering charged particles in a vertical direction of the sample have an area before reaching the sample in which the speed vectors are in a reversed state, a constitution to detect the first order incident charged particles thereof is adopted.

If the incident charged particles to the sample (photoreceptor) are electrons or negative ions, then an electrical potential Vp of the sample is Vp<0, and if the incident charged particles are positive ions, then an electrical potential Vp of the sample is Vp>0. Hereby, incident charged particles are electrons so that an acceleration electrical potential of an electron beam is Vacc(<0), and an electrical potential of the sample is Vp(<0).

In addition, an electrical potential is electrical potential energy possessed by unit charge. Therefore, since incident electrons move at a speed equal to an acceleration voltage Vacc at an electrical potential 0 (V) but the electrical potential becomes higher as incident electrons approach a sample surface, the speed thereby changes due to the influences of the Coulomb repulsion of sample charges. Therefore, the phenomenon hereinbelow generally occurs.

Figure 11A:
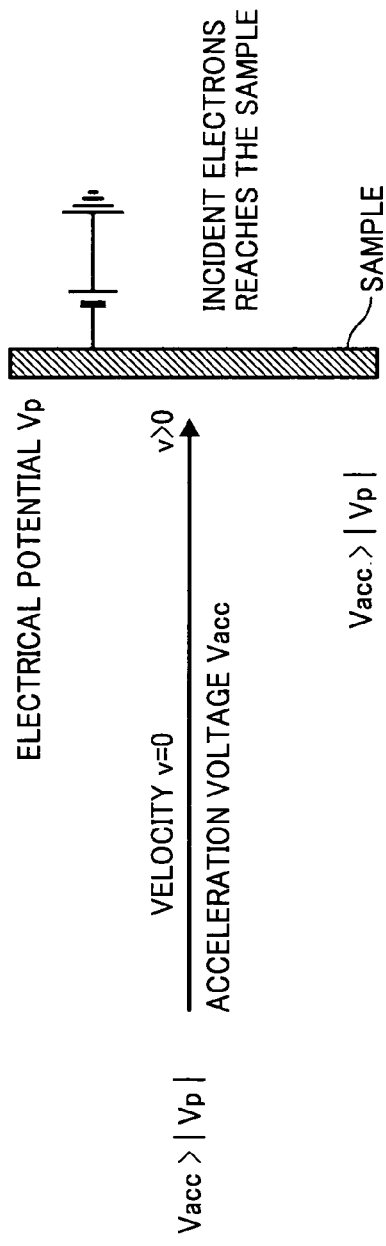
FIG. 11 is a diagram illustrating a relationship between incident electrons and a sample (photoreceptor).

In the case $|Vacc|>|Vp|$, electrons, despite having reduced speed, reach the sample (FIG. 11A).

Figure 11B:
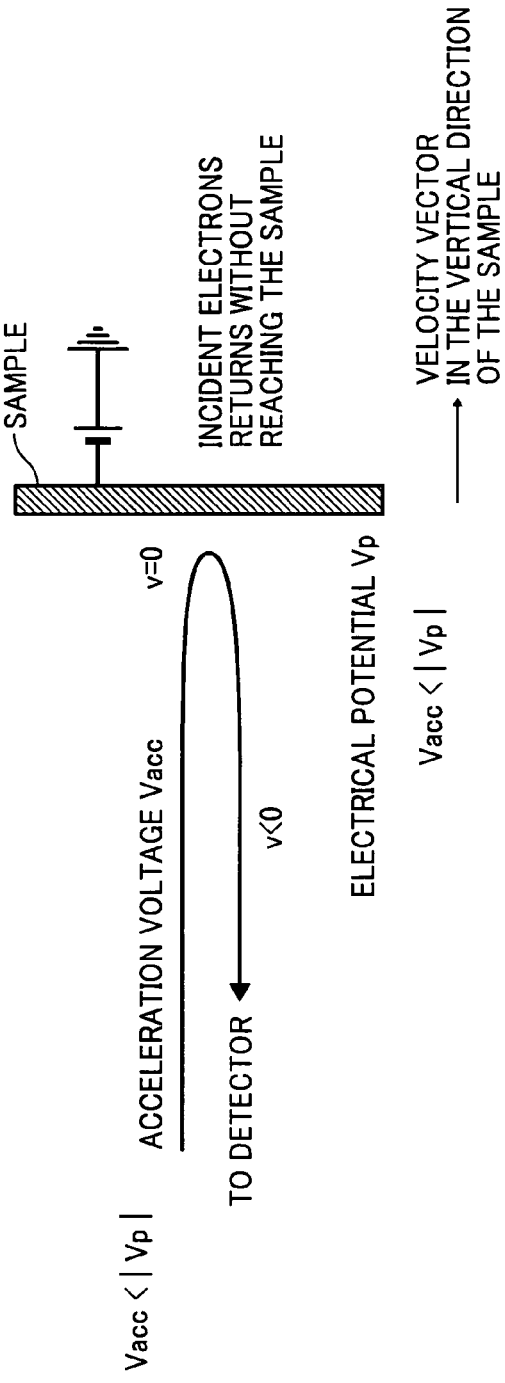

In addition, in the case $|Vacc|<|Vp|$, the speed of the incident electrons receives influences of the electrical potential of the sample and is gradually reduced to 0 before reaching the sample, thereby proceeding in the reverse direction (FIG. 11B).

Within a vacuum without air resistance, the conservation law of energy is realized almost totally. Therefore, by changing the acceleration voltage of incident electrons and determining whether the incident electrons reach the detector, electrical potentials on the surface can be measured. Hereby, the incident electrons are termed first order reflective charged particles, in particular, in the case of electrons, are termed first order reflective electrons.

In addition, in order for the acceleration voltage to have physical meaning as electrical potential, the impression voltage Vacc of the acceleration voltage is negative but generally it is described as positive and the following are defined for distinction:

impression voltage of the acceleration voltage: Vacc(<0)
acceleration voltage: $|Vacc|(>0)$ Here, in FIG. 10, by setting the under part voltage impression device which impresses the voltage to the back side electrode of the sample (photoreceptor) and the acceleration voltage of electron beams from the electron gun to be variable, signal strength information of the first order reflective electrons reaching the detector can be changed.

As a result, electrostatic latent image distribution of an about 2 values image can be obtained with electrical potential Vth as a slash level. Then by image processing the result, the latent image diameter can be calculated.

In addition, data is imported by repeating multiple times a measurement that changes the electrical potential Vth and the data is calculated and processed on a computer so that it is possible to measure an electrical potential profile of surface charges.

In the case $Min|Vp(x)|$ is about 0 to 500V, the acceleration voltage is small and receives influences due to external disturbances or the like, and it is difficult to scan electrons correctly. In this case, by impressing negative voltages Vsub to electrodes situated at an under surface of the sample of FIG. 10, electrical potential on the surface can be raised.

That is, the surface electrical potential equals Vp(x)+Vsub so that $$Min|Vp(x)+Vsub| \leq |Vacc| \leq Max|Vp(x)+Vsub|$$

For example, if Vsub=−500V, then a minimum acceleration voltage $|Vacc|$ is 1 kV, if Vsub=−2000V, then the minimum acceleration voltage $|Vacc|$ is 2.5 kV.

In addition, by impressing Vsub, a range of fluctuations of the impressed voltage $$Max|Vp(x)+Vsub|/Min|Vp(x)+Vsub|$$

can be lessened.

By lessening the range of fluctuations of the impressed voltage, influences of fluctuations of a scan area and fluctuations of a focal point distance can be relatively small.

For example, in the case the surface electrical potential Vp (x) is in the range of −400V through −800V, if Vsub=0V, then $Max|Vp(x)+Vsub|/Min|Vp(x)+Vsub|=2$. If Vsub=−400V, then $|Vp(x)+Vsub|/Min|Vp(x)+Vsub|=1.09$. The fluctuation range thereby is less than 10%.

In this case, since influences against acceleration voltage changes at the time of measurement become relatively small, compensation is not necessary under certain conditions.

Figure 12A:
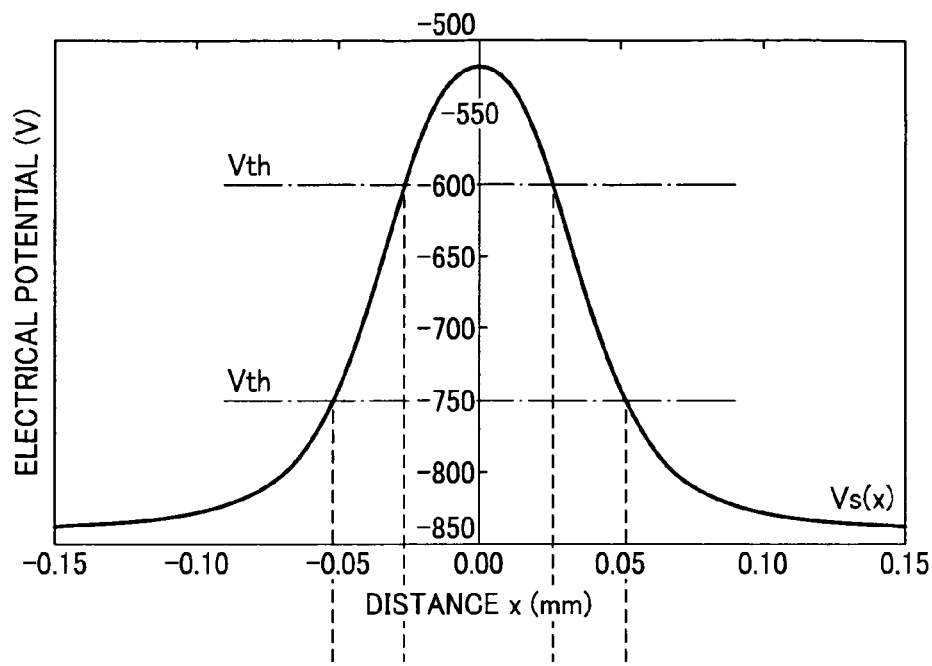
FIG. 12A is a diagram illustrating surface electrical potential distributions Vs (x) generated by electrical charge distributions of a sample (photoreceptor) surface.

FIG. 12A illustrates a surface electrical potential distribution Vs (x) generated by charge distributions of the sample (photoreceptor) surface. Hereby, for convenience, Vs (x)

refers to electrical potential distributions of the surface of a dielectric sample having charge distributions and whose opposite surface is in a grounded state (GND).

As electrical potentials of the center (x=0) proceed towards the external side at about −520V, electrical potentials become larger in the negative direction, around about −830V in the periphery after 0.1 mm.

Figure 12B:
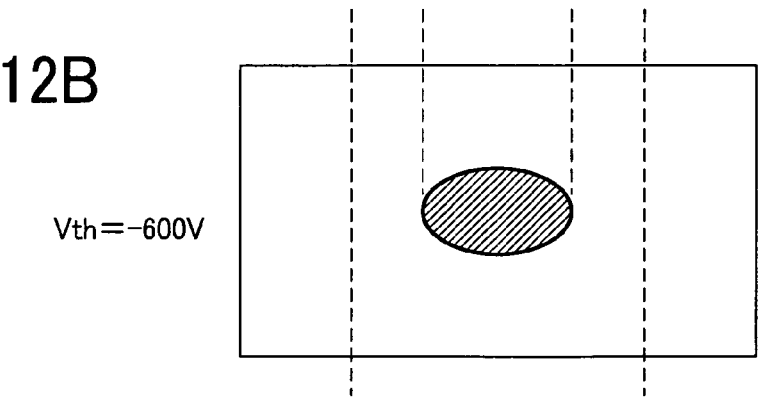
FIGS. 12B, 12C are diagrams illustrating a relationship of a detection signal strength (contrast image) when the sample is scanned two-dimensionally.
Figure 12C:
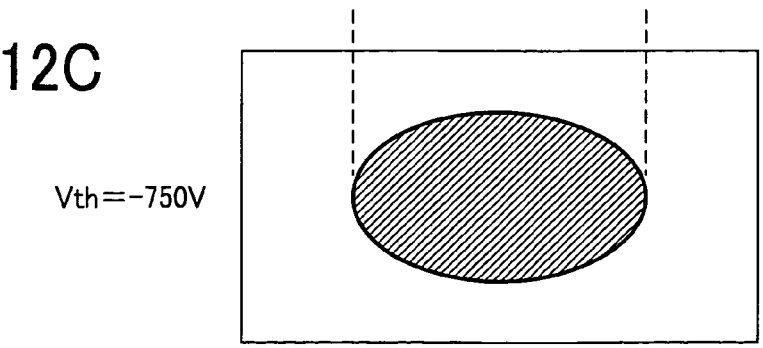

FIGS. 12B and 12C illustrate a relationship of detection signal strength (contrast image) when the sample is scanned two-dimensionally. The white part indicates a large detection quantity. The black part indicates a small detection quantity.

In the case the acceleration voltage Vb of electrons is 600V, the measurement result as illustrated in FIG. 12B is obtained. The white part and the black part have a difference in detection signal quantity of the electrical potential distribution Vs (x). The boundary between the white part and the black pan is a contour line with Vth=−600V as the slash level electrical potential. The contrast image thereof is described as a contrast image of Vth=−600V.

Here, the following is defined.

$$Vth = Vacc + Vsub$$

When Vacc=−750V, the incident electron speed is faster in comparison to when Vacc=−600V so that the possibility to reach the sample is higher, areas in which the speed of incident electrons is reversed are reduced and the black parts are increased. Therefore, a contrast image of Vth=−750V can be obtained. That is, a relationship of Vth=Vacc is realized approximately.

In addition, due to influences of an electrical field environment in the periphery, there are cases in which Vth=Vacc is not necessarily realized. In such cases, a static electrical field environment and electron orbits are calculated beforehand, and compensations are performed later on based on the calculations.

Figure 2A:
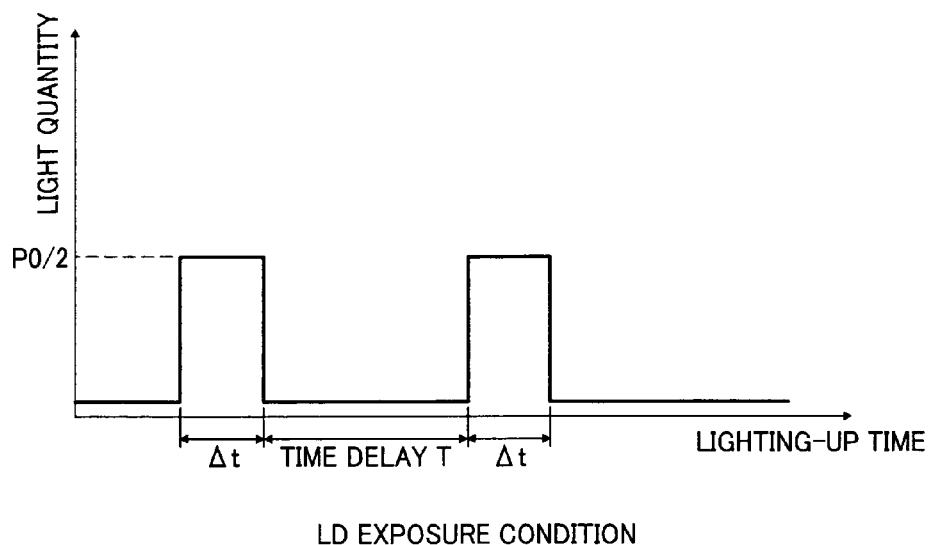
FIG. 2 is a schematic diagram illustrating a relationship between time delay and latent image deepness.
Figure 2B:
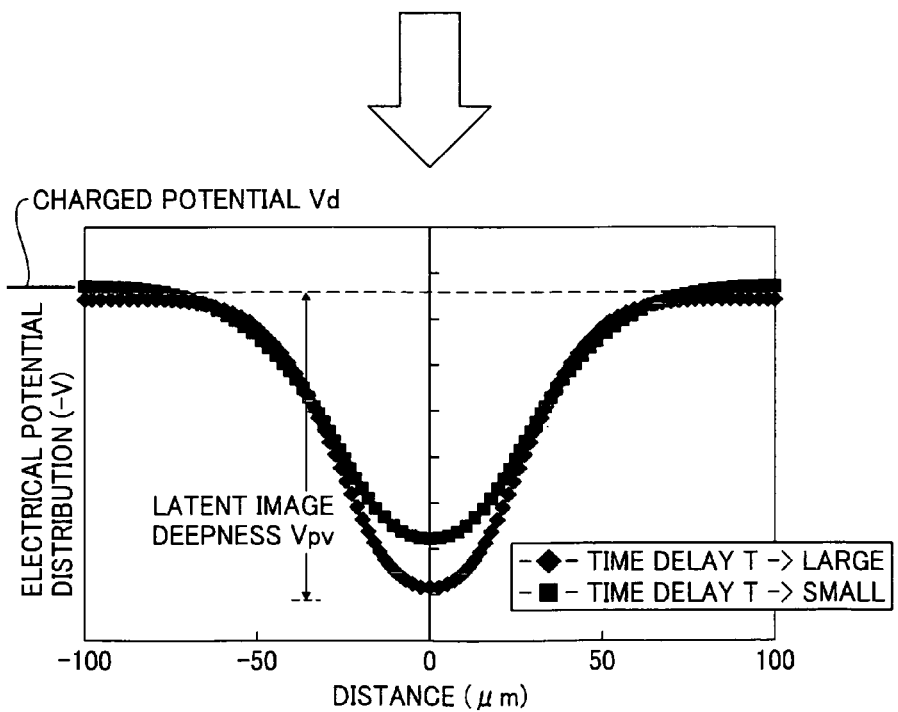
Figure 2C:
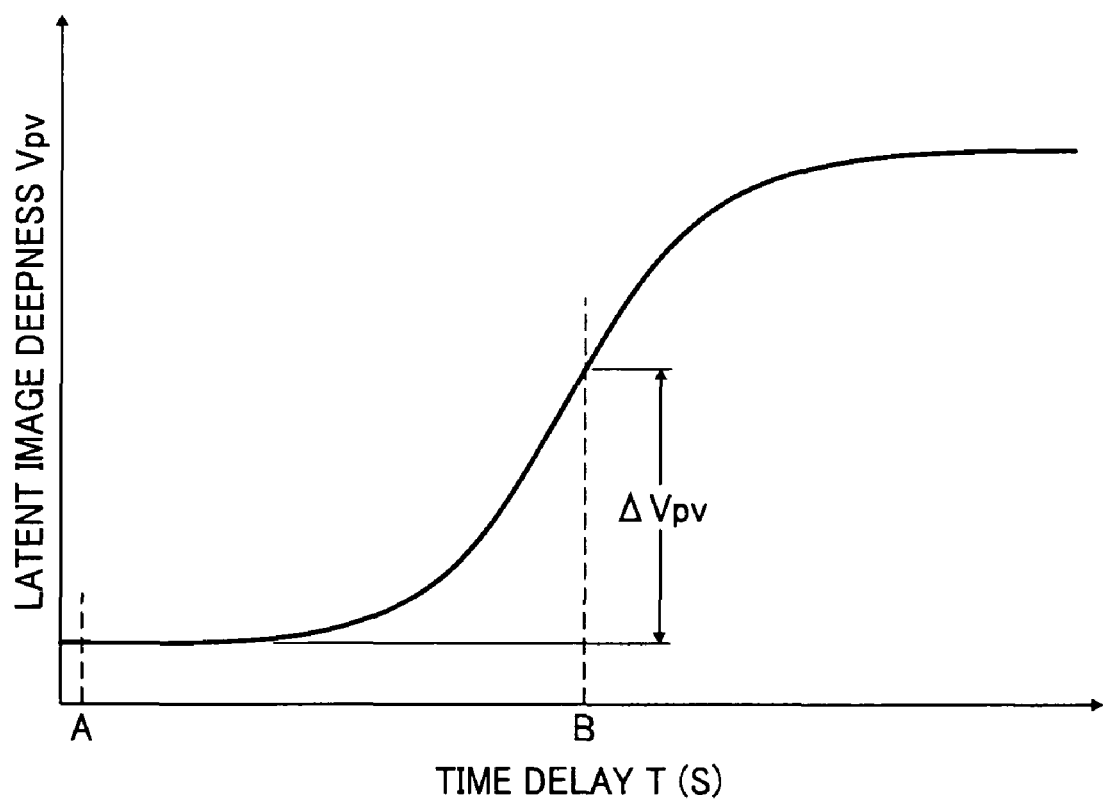

As described above, the electrical potential profile of the sample can be measured by changing the acceleration voltage. Using such methods, under conditions in which exposure energy density is constant, that is, emission light quantity and emission time arc constant, a time delay equal to a scan cycle is changed so that latent image deepness Vpv can be measured. There is a trend that if the time delay becomes longer, latent image deepness Vpv is formed more deeply. When viewed in its entirety, like the relationship between time delay and latent image deepness shown in FIGS. 2A, 2B and 2C, the latent image deepness Vpv changes in an S-shaped curve against the time delay.

Figure 3:
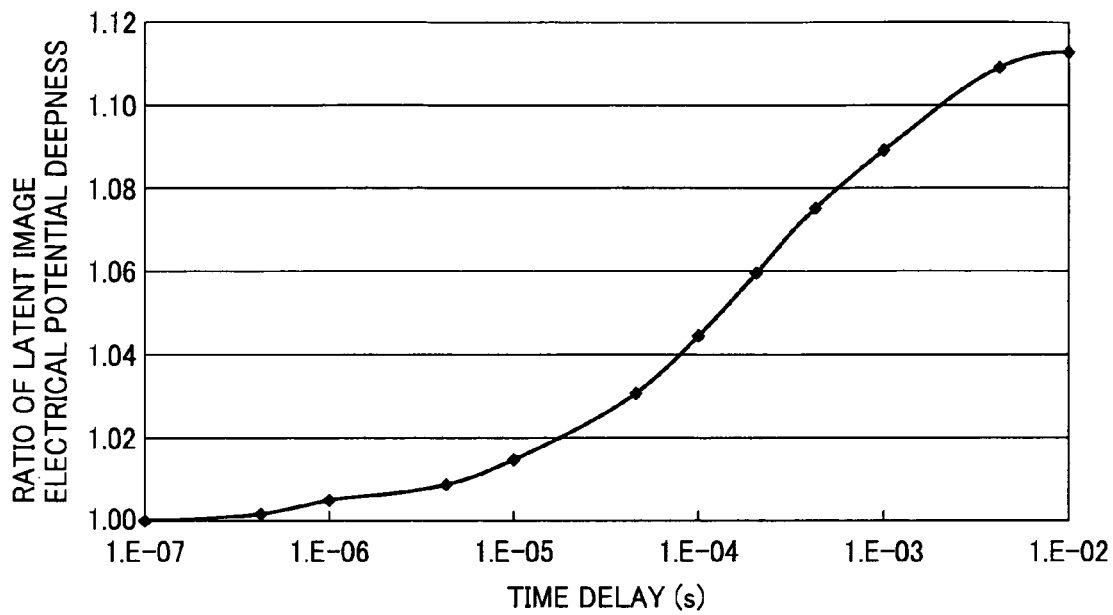
FIG. 3 is a diagram illustrating a relationship between time delay and a ratio of latent image electrical potential deepness.

FIG. 3 is a graph that illustrates the time delay in the horizontal axis, and a ratio of latent image electrical potential deepness in the vertical axis in which electrical potential deepness is measured using the above-described measuring method by changing the time delay at charge potentials=−600 to −800V in a beam diameter range of 30~90 μm. FIG. 3 describes the standardizing of the latent image deepness of simultaneous exposure to 1.

Here, when the time delay (s)=1/scanning frequency (Hz), in the case of a polygon scanner, the following is defined:

scanning frequency (Hz)=polygon number of rotations (rpm)×(polygon number of planes)/60

By the time delay, the latent image electrical potential deepness is large and also has abroadened width.

If the quantity of electrical charges generated by light emission but diminished by charge amount, that is, by electrification charges is effective to deepness and x, y widths, it is found that the quantity of electrical charges is approximately proportional to the cube of the latent image electrical potential deepness.

Figure 4:
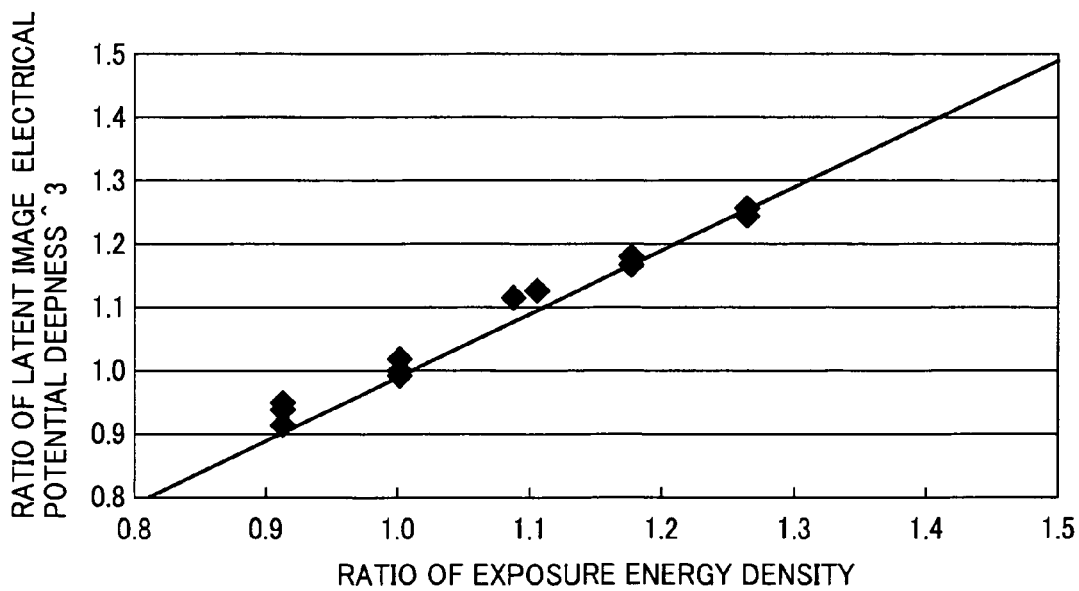
FIG. 4 is a diagram illustrating a relationship between a ratio of exposure energy density and the third power of a ratio of latent image electrical potential deepness.

FIG. 4 illustrates measuring the electrical potential deepness using the above-described measuring method. FIG. 4 is a graph that illustrates a ratio of exposure energy density in the horizontal axis and the cube of a ratio of latent image electrical potential deepness in the vertical axis. It is clear from the graph that a linear relationship exists between the ratio of exposure energy density and the cube of the ratio of latent image electrical potential deepness.

Therefore, in the case latent image deepness changes form Vs1 to Vs_n due to a time delay, because a portion of exposure energy density equal to the cube of (Vs_n/Vs1) is in excess when exposure is completed by light deflection scanning of one time, exposure should be performed so that the portion of exposure energy density in excess is decreased.

Therefore, in order to align latent image electrical potential deepness of areas emitted to an image carrying member (photoreceptor) across a plurality of times of light deflection scanning to the state of simultaneous exposure, a portion of only ΔEx should be reduced so that excess electrical charges do not diminish. Here, ΔEx is equal to $\{(Vs\_n/Vs1)^3-1\} \times Ex1$.

At this time, if the exposure energy density is in the 5% range, the difference of image concentration does not appear in output images so that practically, ΔEx can be set in the range of $$\{(Vs\_n/Vs1)^3 - 1.05\} \times Ex1 < \Delta Ex < \{(Vs\_n/Vs1)^3 - 0.95\} \times Ex1$$

When the above is summarized, in a light scanning apparatus of the present embodiment, the exposure energy density necessary when exposure is completed by light deflection scanning of one time is set to Ex1, latent image electrical potential deepness of an electrostatic latent image formed at that moment is set to Vs1 (V), the total exposure energy density when light is emitted to the image carrying member across a plurality of times of light deflection scanning is set to Ex_n, latent image electrical potential deepness at that time is set to Vs_n (V), the total exposure energy density Ex_n when light is emitted to the image carrying member across a plurality of times of light deflection scanning is set to satisfy the following conditions and under which exposure is performed.

$$Ex\_n = Ex1 - \Delta Ex$$

$$\{(Vs\_n/Vs1)^3 - 1.05\} \times Ex1 < \Delta Ex < \{(Vs\_n/Vs1)^3 - 0.95\} \times Ex1$$

Here, as a specific embodiment, in the case Vs_n/Vs1=1.057, (Vs_n/Vs1)^3=1.18, so that ΔEx is set in the range of $$\Delta Ex = 0.13 - 0.23 \times Ex1$$

In addition, in the case Vs_n/Vs1=1.08, (Vs_n/Vs1)^3=1.26, so that ΔEx is set in the range of $$\Delta Ex = 0.21 - 0.31 \times Ex1$$

In addition, because the exposure energy density is shown by "image plane light quantity×emission time/emission area", in order to compensate the exposure energy density in its entirety, a method of lessening the image plane light quantity and a method of shortening the emission time, that is, the duty can be used. In order to lessen image plane light quantity, it is effective to micrify the light power of the light source.

Therefore, when exposure is completed in a normal one time scanning, exposure is performed at Ex1. In areas that perform exposure by a plurality of times of light deflection scanning due to influences of a boundary of a multi-beam or the like, by setting the total exposure energy density Ex_n to Ex1−ΔEx, a good electrostatic latent image with little image concentration irregularity can be formed.

[Embodiment 2]

Next, a second embodiment and a third embodiment are described.

In a multi-beam scanning optical system of VCSEL or the like, there is a method of multiple exposure using a plurality of beams.

Figure 5A:
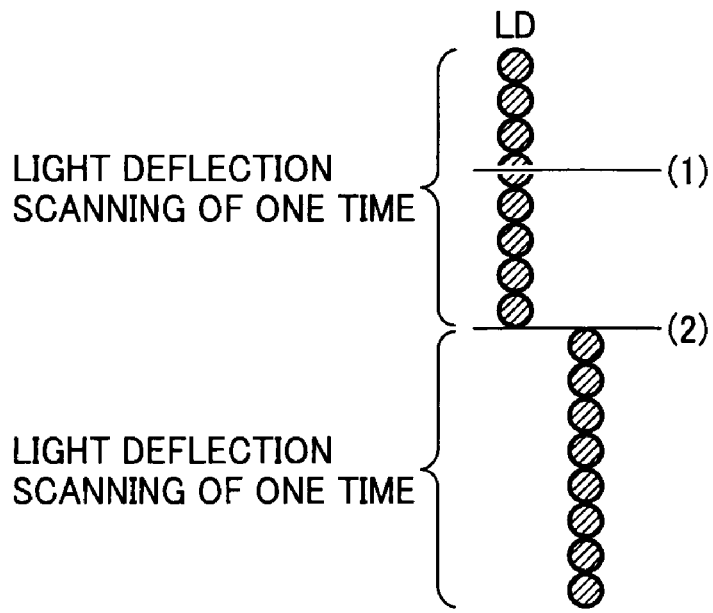
FIG. 5 is a diagram illustrating an embodiment in which 8 LDs are scanned adjacently.
Figure 5B:
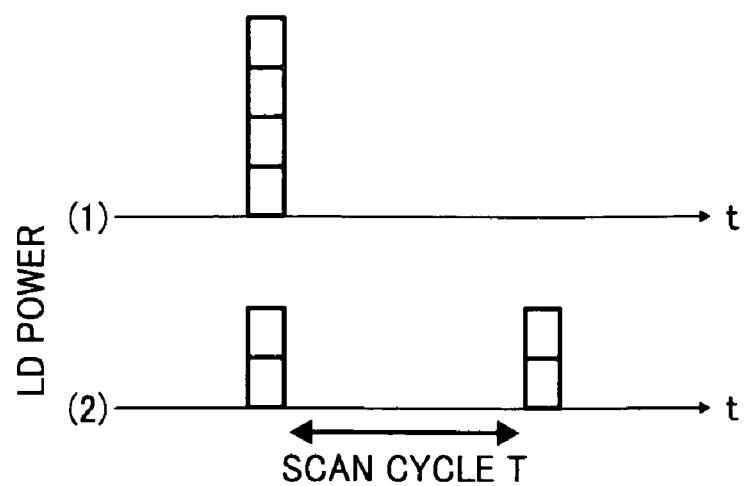

FIG. 5 is an embodiment in which 8 adjacent LDs are scanned. In this method, FIG. 5A -(1) illustrates the case in which exposure is completed in light deflection scanning of one time, FIG. 5A-(2) illustrates the case in which exposure is completed across light deflection scanning of two times.

Figure 6A:
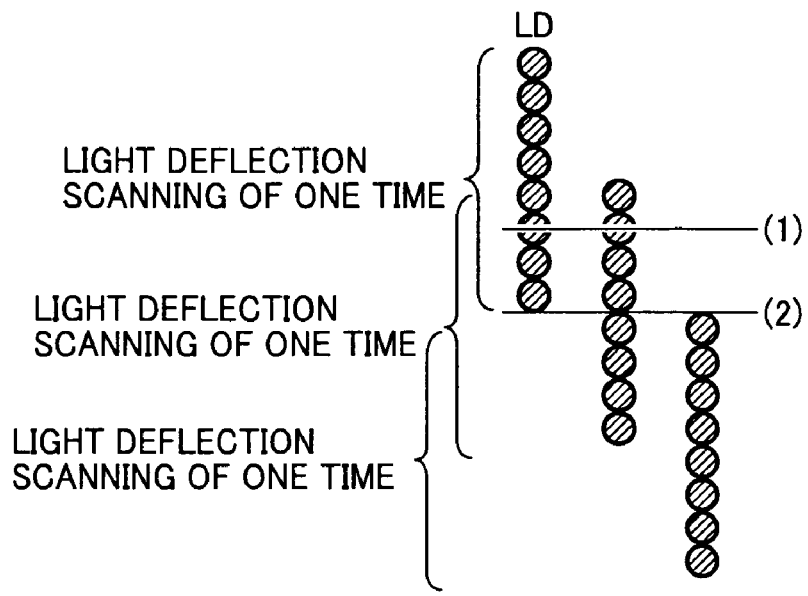
FIG. 6 is a diagram illustrating an embodiment in which 8 LDs are performed overstriking scanning adjacently.
Figure 6B:
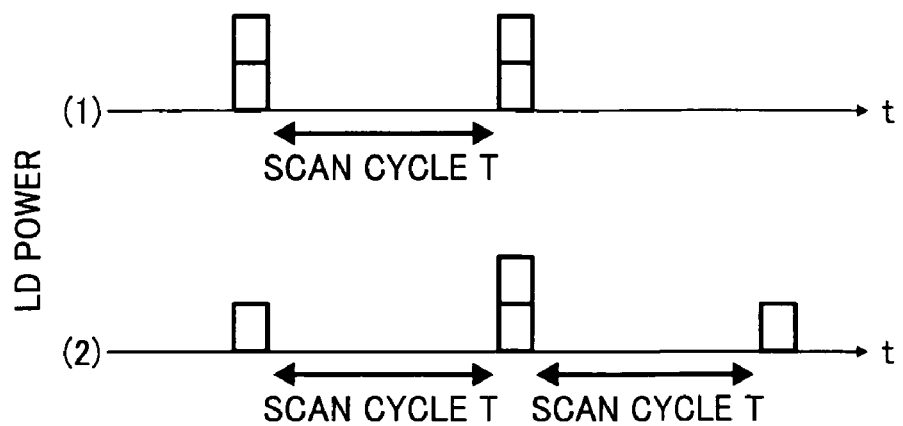

In addition, FIG. 6 is the same as FIG. 5 in that 8 LDs are scanned but half is an overstriking scanning in which areas scanned double the previous areas scanned. In principle, FIG. 6A-(1) illustrates the case in which the necessary exposure energy is obtained by light deflection scanning of two times, FIG. 6A-(2) illustrates the case in which exposure is completed across light deflection scanning of three times.

In a multi-beam light scanning apparatus as such, there are cases in which exposure is completed by a minimum m times light deflection scanning. There are also cases in which exposure is completed across light deflection scanning of m+k times. FIG. 5 is the case in which m=1, k=1. FIG. 6 is the case in which m=2, k=1. In addition, m=3 for threefold exposure scanning.

In addition, in the case the pitch of LDs is extremely small in comparison to a beam spot diameter or in the case exposure is completed across light deflection scanning of a plurality of times, the possibility of k≧2 emerges and more complex combinations are generated in comparison to the cases in which exposure is completed by light deflection scanning of only one time.

In this way, exposure energy compensation quantity due to reciprocity failure differs slightly in each case.

In the case of a method that completes exposure by a plurality of times of light deflection scanning, since exposure is performed in which a time delay is generated at a standard state, despite exposure energy compensation quantity due to reciprocity failure being in an inclination to be eased, a state of performing exposure further across m +k times is generated. As a result, image concentration irregularity is generated.

Therefore, in areas across m+k times, emission needs to be performed in an exposure energy density Ex_mk smaller than the total exposure energy density Ex_m emitted during the normal m times.

Specifically, since the exposure energy density necessary when exposure is completed in light deflection scanning of m times is set to Ex_m, the latent image electrical potential deepness of an electrostatic latent image formed thereby is set to Vs_m (V). The total exposure energy density when an image carrying member is emitted across light deflection scanning of m+k times is set to Ex_mk, the latent image electrical potential deepness thereby is set to Vs_mk (V), the total exposure energy density Ex_mk when the image carrying member is emitted across light deflection scanning of m+k times is set so that it satisfies the following conditions:

$Ex\_mk = Ex\_m - \Delta Ex$ $\{(Vs\_mk/Vs\_m)^3 - 1.05\} \times Ex\_m < \Delta Ex < \{(Vs\_mk/Vs\_m)^3 - 0.95\} \times Ex\_m$ and emission (exposure) is performed at the exposure energy density Ex_mk.

In addition, in a double exposure scanning where m=2, k=1, in the case Vs_mk/Vs_m=1.037, then $(Vs\_mk/Vs\_m)^3 = 1.11$ so that $\Delta Ex$ is set in the range of $\Delta Ex = 0.06 \sim 0.16 \times Ex1$

[Embodiment 3]

Next, a fourth embodiment, a fifth embodiment and a sixth embodiment are described.

An image forming apparatus has for example, a high speed mode and a high image quality mode. The differing modes are used separately according to environment of usage. In this case, a light scanning apparatus corresponds by changing the rotation frequency of a light deflector such as a polygon scanner or the like.

In such a case, the scan frequency differs so that the degree of influences of reciprocity failure also changes. Therefore, a setting of compensation quantity of light quantity needs to be changed in correspondence. In the case only scan frequency is changed, light quantity compensation can be implemented by the following methods.

Figure 7:
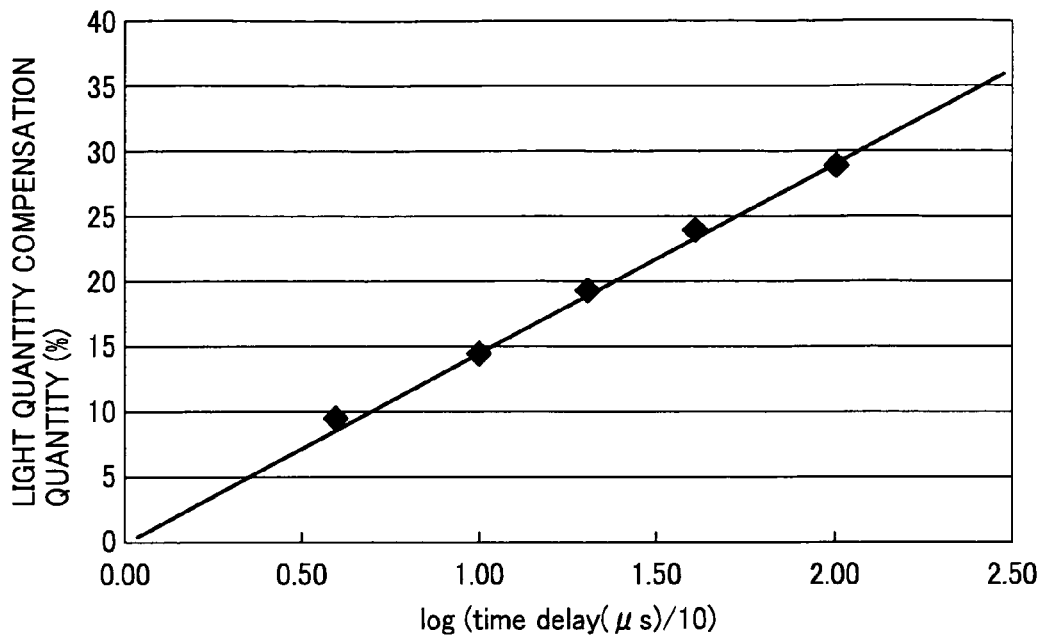
FIG. 7 is a diagram illustrating a relationship between the logarithms of time delay and light quantity correction amount.

FIG. 7 illustrates a relationship when a logarithm of time delay T1 (μs) is set as the horizontal axis and compensation quantity of light quantity is set as the vertical axis. It is found that the compensation quantity of light quantity changes linearly against the logarithm of time delay, in particular, changes linearly when the time delay is in the range of 40 μs to 1 ms. In addition, the slope α is 0.14.

Therefore, when the exposure energy density necessary for completing exposure by light deflection scanning of m times is set to Ex_m, the total exposure energy density for irradiating an image carrying member across light deflection scanning of m+k times is set to Ex_mk, it is desirable that the light quantity be compensated by setting Ex_m-Ex_mk logarithmically against the scan cycle of a light deflector.

In addition, in the present invention, when a scan cycle of a light deflector is set to T1 (μs), exposure energy density necessary for completing exposure by light deflection scanning of m times is set to Ex_m, total exposure energy density for irradiating the image carrying member across light deflection scanning of m+k times is set to Ex_mk, exposure is performed under a setting satisfying the following conditions:

$Ex\_mk = Ex\_m - \Delta Ex$ $\{0.14 \times \log(T1/10)/(m+k-1) - 0.05\} \times Ex\_m < \Delta Ex$ $\Delta Ex < \{0.14 \times \log(T1/10)/(m+k-1) + 0.05\} \times Ex\_m$ Hereby, when exposure energy density necessary when exposure is completed by light deflection scanning of one time (m=1) is set to Ex_1, the total exposure energy density when the image carrying member is emitted across light deflection scanning of two times (m+k=2) is set to Ex_2, and the exposure energy density is set so that $Ex\_2 = Ex\_1 - \Delta Ex$ $\{0.14 \times \log(T1/10) - 0.05\} \times Ex\_1 < \Delta Ex < \{0.14 \times \log(T1/10) + 0.05\} \times Ex\_1$ In addition, if the values of m and k become large, it becomes dispersed and not concentrated in one spot, and latent image electrical potential difference appears less.

Therefore, exposure energy density necessary when exposure is completed by light deflection scanning of m times is set to Ex_m, total exposure energy when the image carrying body is emitted across light deflection scanning of m+k times is set to Ex_mk, and the exposure energy density is set to satisfy the following conditions described above, $$Ex\_mk = Ex\_m - \Delta Ex$$

$$\{0.14 \times \log(T1/10)/(m+k-1) - 0.05\} \times Ex\_m < \Delta Ex$$

$$\Delta Ex < \{0.14 \times \log(T1/10)/(m+k-1) + 0.05\} \times Ex\_m$$

specifically, the exposure energy density can be set under the conditions illustrated hereinbelow.

(1) in the case m=1, k=1,

14% in the case a scan cycle is 100 μs, therefore a light quantity compensation quantity of 9-19% is preferred.

19% in the case the scan cycle is 250 μs, therefore the light quantity compensation quantity of 14-24% is preferred.

22% in the case the scan cycle is 400 μs, therefore the light quantity compensation quantity of 17-27% is preferred.

25% in the case the scan cycle is 600 μs, therefore the light quantity compensation quantity of 20-30% is preferred.

(2) in the case m=2, k=1,

7% in the case a scan cycle is 100 μs, therefore a light quantity compensation quantity of 2-12% is preferred.

9.5% in the case the scan cycle is 250 μs, therefore the light quantity compensation quantity of 4.5-14.5% is preferred.

11% in the case the scan cycle is 400 μs, therefore the light quantity compensation quantity of 5.5-15.5% is preferred.

12.5% in the case the scan cycle is 600 μs, therefore the light quantity compensation quantity of 6.25-16.25% is preferred.

(3) in the case m=3, k=2, 3.5% in the case a scan cycle is 100 μs, therefore a light quantity compensation quantity of 0-8.5% is preferred.

4.75% in the case the scan cycle is 250 μs, therefore be light quantity compensation quantity of 0-9.75% is preferred.

5.5% in the case the scan cycle is 400 μs, therefore the light quantity compensation quantity of 0.5-10.5% is preferred.

6.25% in the case the scan cycle is 600 μs, therefore the light quantity compensation quantity of 1.25-11.25% is preferred.

As just described, if the values of m and k increase, influences due to reciprocity failure become relatively small, and it is clear that compensation becomes necessary depending on certain scan cycles.

In addition, a light deflector is not limited to a polygon scanner constituted from a polygon mirror and a polygon motor, but a light deflector that performs cyclic light scanning such as a galvanometer mirror or a micro scanner or the like can be preferably used and light quantity compensation can be performed in the same manner.

As illustrated in FIG. 7, latent image deepness changes if the time delay differs. Time delay is already generated in a multi-beam light scanning apparatus in which exposure is completed across light deflection scanning of a plurality of times so that by changing the scan frequency of a light deflector of the light scanning apparatus, latent image deepness differs.

Therefore, according to FIG. 7, in the case a scan cycle of the light deflector of the light scanning apparatus becomes longer, the conditions described in the embodiment 6 need to be set so that the exposure energy density becomes small.

That is, in order for the exposure quantity emitted to the image carrying member to reach a predetermined exposure quantity, in the case light deflection scanning of m times is necessary, the exposure energy density necessary to complete exposure across light deflection scanning of m times is set to Ex_fv0 when one scan frequency of a light deflector is set to fv0 (Hz), the exposure energy density necessary to complete exposure across light deflection scanning of m times is set to Ex_fv1 when another scan frequency of the light deflector is set to fv1 (Hz), and the exposure energy density in the case fv1<fv0 has the setting changed so that the following condition is satisfied:

$$Ex\_fv1 < Ex\_fv0$$

In particular, it is effective to compensate exposure energy in proportion to the logarithm of the scan frequency ratio, that is, log(fv0/fv1).

[Embodiment 4]

Next, a seventh embodiment is described. Hereby, an example of a method that forms an electrostatic latent image on a photoreceptor sample is illustrated.

Figure 8:
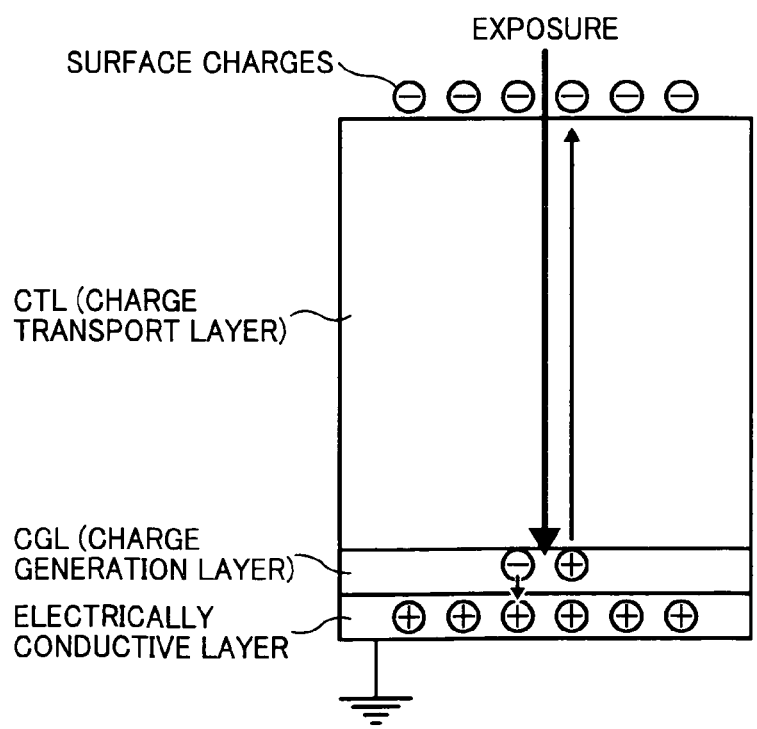
FIG. 8 is a cross-sectional diagram of an approximate chief part illustrating an example of a constitution of a photoreceptor used for latent image formation.
Figure 9:
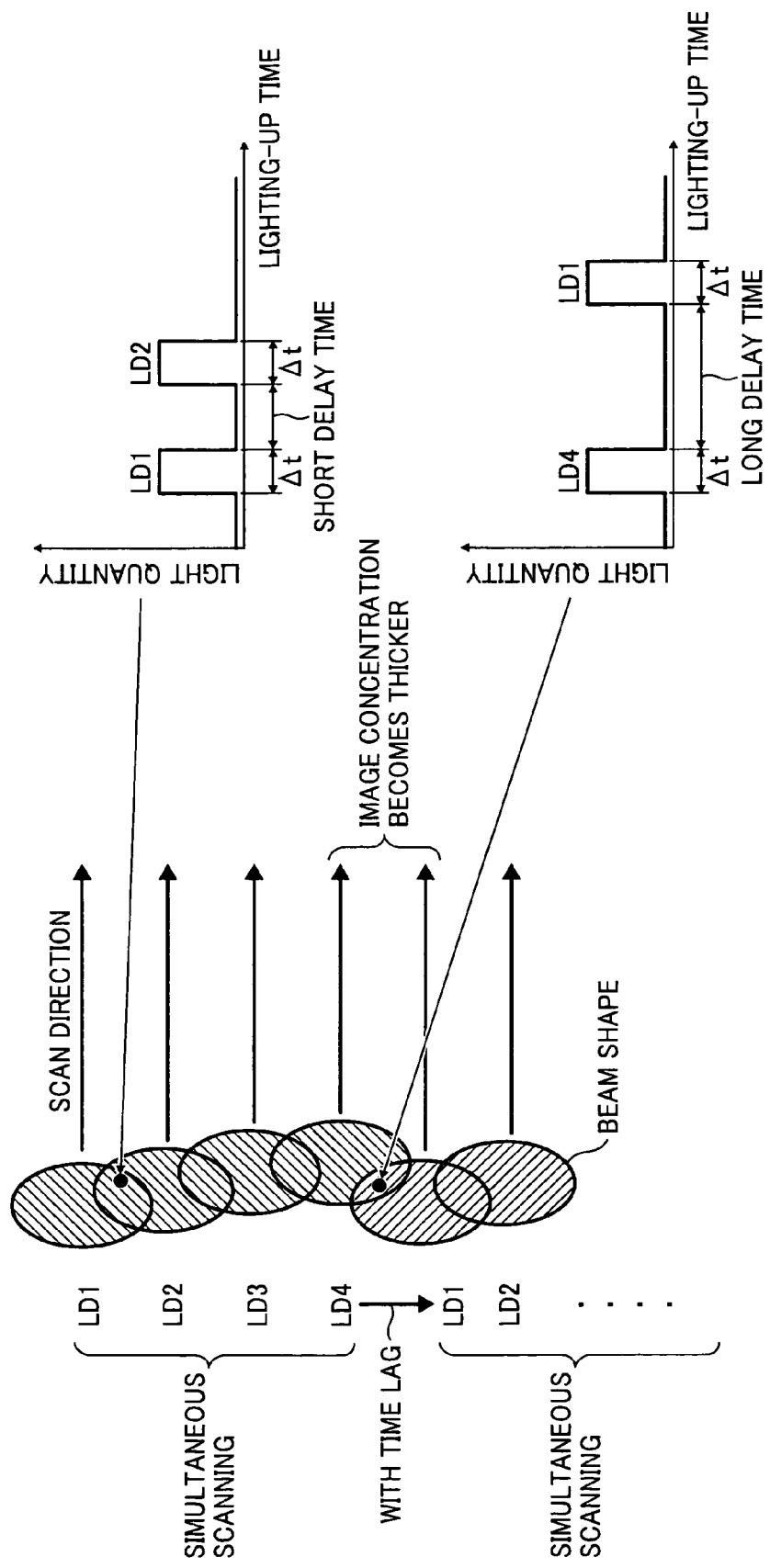
FIG. 9 is a schematic diagram illustrating the light emitting timing and the problematic points thereof when a 4ch LDA (4 channel laser diode array) is used as a scanning optical system of an image forming apparatus.

FIG. 8 is a cross-sectional diagram of a general outline of a chief part illustrating a constitutional example of a photoreceptor. FIG. 8 is an example of an organic photoreceptor in which the photoreceptor disposed on an electrically conductive support (electrically conductive layer) is constituted from a charge generation layer (CGL) and a charge transport layer (CTL). When light beams are exposed in a state in which surface charges on the surface of CTL are electrically charged, light is absorbed by a charge generation material (CGM) of CGL and positive and negative bipolar charge carriers plus are generated. The carriers are injected either to the CTL or to the electrically conductive support due to an electrical field. The carriers injected to the CTL move from the midst of the CTL to the surface of the CTL due to the electrical field, and unite with charges on the photoreceptor surface to be erased. In addition, the CGL works to prevent charge injections from the electrically conductive support. In such a way, charges are distributed on the photoreceptor surface, that is, an electrostatic latent image is formed.

As a specific example of a latent image forming apparatus, using the light scanning apparatus 110 of a constitution illustrated in FIG. 1 as an exposure device of light beams, by performing multi-beam light scanning under an exposure condition and an exposure method described in embodiments 1 to 3, an electrostatic latent image with little scattering can be formed on the photoreceptor 111.

[Embodiment 5]

Next, an eighth embodiment is described.

Figure 13:
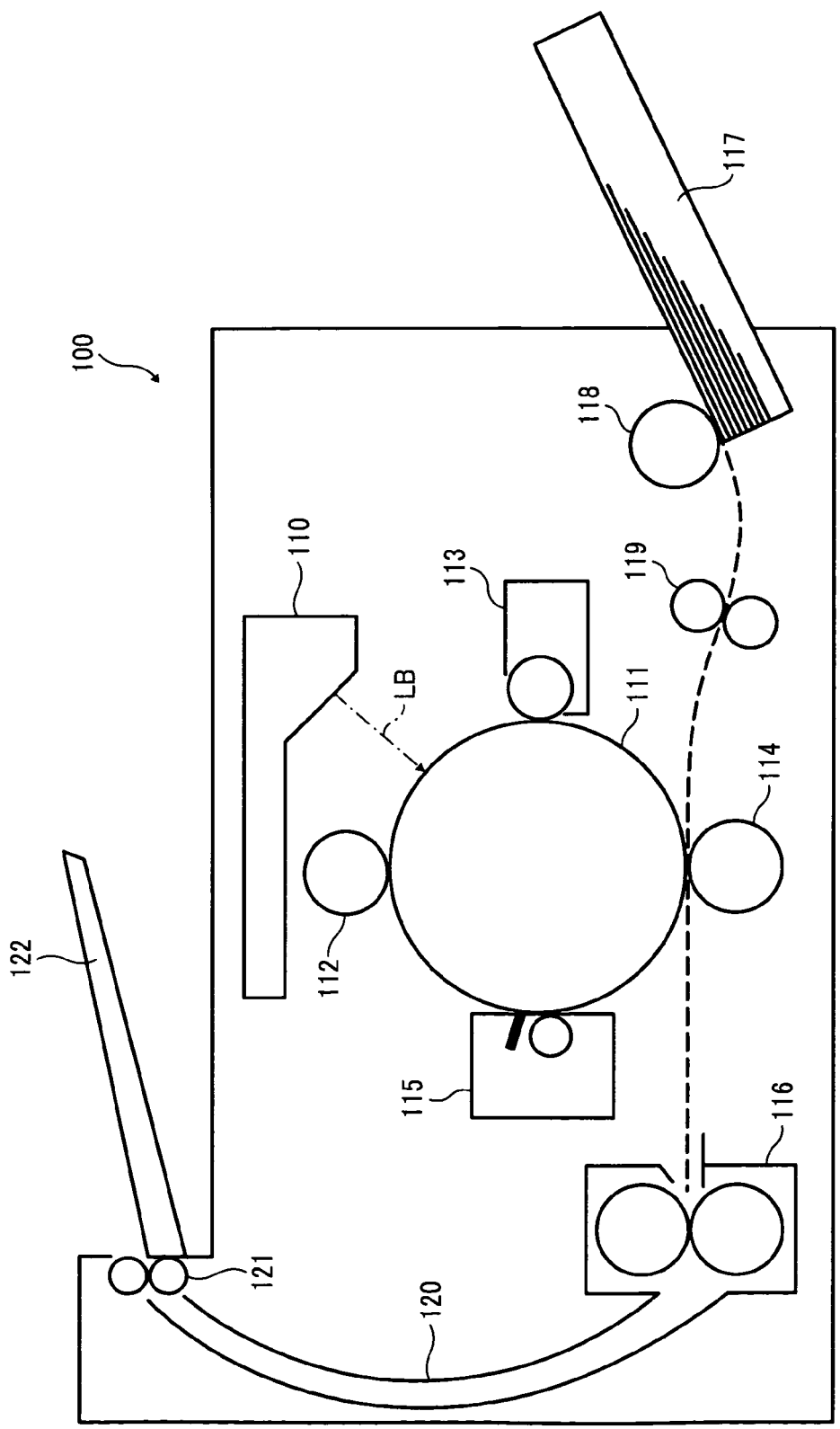
FIG. 13 is a diagram of an approximate constitution of an image forming apparatus illustrated in an embodiment of the present invention.

FIG. 13 is a diagram of a general constitution of an image forming apparatus illustrating one embodiment of the present invention. FIG. 13 illustrates generally an example of a laser printer. The laser printer 100 includes an image carrying member 111, for example, a photoconductive photoreceptor formed cylindrically. Around the periphery of the image carrying member 111, a charge device, for example, a charge roller 112, an image development device 113, a transfer roller 114 and a cleaning device 115 are disposed. In this embodiment, the charge roller 112 of a contact method with little ozone generation is used as the charge device but a corona charger that utilizes corona discharge can also be used as the charge device. In addition, a latent image forming device, for example, a light scanning device 110 of a constitution illustrated in FIG. 1 is disposed and performs "exposure by light scanning of laser beam LB" between the charge roller 112 and the image development device 113. In addition, in FIG. 13, reference number 116 is an anchorage device. Reference number 117 is a cassette. Reference number 118 is a paper feeding roller. Reference number 119 is a resist roller pair. Reference number 120 is a carrier path. Reference number 121 is a paper ejection roller pair. Reference number 122 is a paper ejection tray.

When performing image formation, the image carrying member 111, which is a photoconductive photoreceptor, is rotated clock-wisely at constant velocity. The surface of the image carrying member 111 is charged uniformly by the charge roller 112. An electrostatic latent image is formed by exposure by light writing by laser beam LB of the light scanning apparatus 110. The electrostatic latent image formed is a so-called "negative latent image" in which an image part is exposed. This electrostatic latent image is given reversal development by the image development device 113 and a toner image is formed on the image carrying member 111. The cassette 117 storing transfer paper is attached detachably to the image forming apparatus 100 main body, in a mounted state illustrated by the figure, and a sheet of paper situated on the uppermost position of the stored transfer paper is fed through the paper feeding roller 118. The tip end part of the fed transfer paper is chewed by the resist roller pair 119. The resist roller pair 119 feeds in the transfer paper to a transfer part in correspondence to the timing when the toner image on the image carrying member 111 is moved to a transfer position. The transfer paper fed in is superimposed with the toner image at the transfer part and the toner image is electro-statically transferred by operations of the transfer roller 114. The toner image transferred to the transfer paper is fixed to the transfer paper by the anchorage device 116. The transfer paper then passes through the carrier path 120 and is discharged onto the paper ejection tray 122 by the paper ejection roller pair 121. In addition, after the toner image is transferred, the surface of the image carrying member 111 is cleaned by the cleaning device 115 so that residual toners and paper powder or the like are removed.

An image forming apparatus of the above constitution uses a latent image forming apparatus, for example, the light scanning apparatus 110 described in the embodiment 1 to 3 or the latent image forming apparatus described in the embodiment 4 to form a latent image on the image carrying member 111. Then the latent image is developed by the image development device 113 to be visualized. Thereby an image making system with little occurrence of reciprocity failure is realized and high quality image formation in which image concentration irregularity does not occur can be performed. Therefore, a high luster and long lasting image forming apparatus with excellent resolution and high reliability can be realized.

A constitutional example of a laser printer is illustrated in FIG. 13 as an embodiment of the image forming apparatus. By disposing a manuscript reading device (scanner) and a manuscript carrier device (ADF) or the like on the upper part of the printer, the printer can be used as a digital copier. By further adding a communication function or the like, the printer can be used as a laser facsimile and a digital hybrid machine.

In addition, although a monochrome image forming part is illustrated in FIG. 13, but by arraying in a line in the carrier direction of transfer paper a plurality of image forming parts including the image carrying member and other constitutional members in the periphery, an image forming apparatus corresponding to a multi-color image and a full color image can be constituted. When a light scanning apparatus according to the present invention is used as a latent image forming device also in this case in which the laser printer is constituted corresponding to multi-color and full color, a high luster and long lasting image forming apparatus with excellent resolution and high reliability can be realized.

According to one aspect of the present invention, in a light scanning apparatus according to the an embodiment of the present invention, in consideration of time delay and exposure energy by scanning of the light deflection device, by controlling the light source so that the total exposure energy density emitted to the image carrying body across light deflection scanning of a plurality of times becomes constant on the image carrying member (that is, the latent image electrical potential on the image carrying member becomes constant) and a high quality, long lasting output image can be obtained.

According to another aspect of the present invention, in a light scanning apparatus according to an embodiment of the present invention, in consideration of time delay and exposure energy by scanning of the light deflection device, by controlling the light source so that the total exposure energy density emitted to the image carrying body across light deflection scanning of a plurality of times becomes constant on the image carrying member (that is, the latent image electrical potential on the image carrying member becomes constant) and a high quality, long lasting output image can be obtained.

In addition, in this multi-beam light scanning apparatus, it is particularly effective against overstriking scanning and jump over scanning in which exposure of at least a plurality of times are necessary to reach the exposure energy density.

According to still another aspect of the present invention, in a light scanning apparatus according to an embodiment of the present invention, in addition to the same effects as the second embodiment, it is particularly effective in the case the scan frequency of the light deflection device is changed within the actual machine because of differing modes of image output.

In addition, even when the latent image electrical potential deepness is not known, the compensation quantity of light quantity can be set appropriately in correspondence to the number of rotations of the light deflection device so that even when the scan frequency is changed, an image maintaining high image quality can be obtained.

According to still another aspect of the present invention, in a latent image forming apparatus according to an embodiment of the present invention, using the light scanning apparatus of the present embodiment, a latent image forming apparatus with little scattering of electrostatic latent image can be provided. In addition, process quality of each processing is improved so that a high image quality, long lasting, highly stable and energy saving latent image forming apparatus can be realized.

According to still another aspect of the present invention, in an image forming apparatus according to an embodiment of the present invention, it is characteristic that a latent image is formed on the image carrying member using the light scanning apparatus of the present embodiment or using the latent image forming apparatus of the present embodiment, the latent image is developed by the development device and visualized so that an image making system with little occurrence of reciprocity failure is realized and a high quality image forming apparatus in which image concentration irregularity does not occur can be provided.

While preferred embodiment of the invention has been described and illustrated above, it should be understood that these are exemplary of the invention and are not to be considered as limiting. Additions, omissions, substitutions, and other modifications can be made without departing from the sprit or scope of the present invention. Accordingly, the invention is not to be considered as being limited by the foregoing description, and is only limited by the scope of the appended claims.

What is claimed is:

1. A light scanning apparatus,
wherein a light beam emitted from a plurality of light sources is imaged on an image carrying member as a medium to be scanned via a scanning optical system including a light deflection device, in the case light deflection scanning of at least m times are necessary in order for an exposure quantity emitted to the image carrying member to reach a predetermined exposure quantity, wherein if the total exposure energy density necessary when exposure is completed by light deflection scanning of m times is set to Ex_m and the total exposure energy density when the image carrying member is emitted across light deflection scanning of m+k times is set to Ex_mk, the light scanning apparatus compensates light quantity by setting $$Ex\_m-Ex\_mk$$

logarithmically against a scan cycle of a light deflector.

2. A light scanning apparatus according to claim 1, wherein if the scan cycle of the light deflector is set to T1 (μs), exposure energy density necessary when exposure is completed by light deflection scanning of m times is set to Ex_m and the total exposure energy density when the image carrying member is emitted across light deflection scanning of m+k times is set to Ex_mk, the light scanning apparatus is performed exposure satisfying the following condition:

$$Ex\_mk = Ex\_m - \Delta Ex\ \{0.14 \times \log(T1/10)/(m+k-1) - 0.05\} \times Ex\_m < \Delta Ex\quad \Delta Ex < \{0.14 \times \log(T1/10)/(m+k-1)+0.05\} \times Ex\_m.$$

3. A latent image forming apparatus, wherein multi-beam light scanning is performed using the light scanning apparatus according to claim 2 so that a latent image is formed on the image carrying member.

4. An image forming apparatus, wherein the light scanning apparatus according to claim 2 is used and light scanning is performed against a light-sensitive surface of the image carrying member so that a latent image is formed, the latent image is developed by a development device to be visualized.

5. A light scanning apparatus according to claim 1, wherein, if one scan frequency of the light deflection device is set to fv0 (Hz), exposure energy density necessary when exposure is completed across light deflection scanning of m times is set to Ex_fv0 and another scan frequency of the light deflection device is set to fv1 (Hz), exposure energy density necessary when exposure is completed across light deflection scanning of m times is set to Ex_fv1, the exposure energy density of the light scanning apparatus in the case $$fv1 < fv0$$

satisfies the following condition:

$$Ex\_fv1 < Ex\_fv0.$$

6. A latent image forming apparatus, wherein multi-beam light scanning is performed using the light scanning apparatus according to claim 5 so that a latent image is formed on the image carrying member.

7. An image forming apparatus, wherein the light scanning apparatus according to claim 5 is used and light scanning is performed against a light-sensitive surface of the image carrying member so that a latent image is formed, the latent image is developed by a development device to be visualized.

8. A latent image forming apparatus, wherein multi-beam light scanning is performed using the light scanning apparatus according to claim 1 so that a latent image is formed on the image carrying member.

9. An image forming apparatus, wherein the light scanning apparatus according to claim 1 is used and light scanning is performed against a light-sensitive surface of the image carrying member so that a latent image is formed, the latent image is developed by a development device to be visualized.

10. A light scanning apparatus, wherein a light beam emitted from a plurality of light sources is imaged on an image carrying member as a medium to be scanned via a scanning optical system including a light deflection device having a light deflector, in the case light deflection scanning of at least m times are necessary in order for an exposure quantity emitted to the image carrying member to reach a predetermined exposure quantity, wherein if a scan cycle of the light deflector is set to T1 (μs), exposure energy density necessary when exposure is completed by light deflection scanning of m times is set to Ex_m and the total exposure energy density when the image carrying member is emitted across light deflection scanning of m+k times is set to Ex_mk, the light scanning apparatus is configured to perform exposure satisfying the following condition:

$$Ex_{13}\ mk = Ex_{13}\ m - \Delta Ex$$

$$\{0.14 \times \log(T1/10)/(m+k-1)-0.05\} \times Ex\_m < \Delta Ex$$

$$\Delta Ex < \{0.14 \times \log(T1/10)/(m+k-1)+0.05\} \times Ex\_m.$$

11. A light scanning apparatus, wherein a light beam emitted from a plurality of light sources is imaged on an image carrying member as a medium to be scanned via a scanning optical system including a light deflection device, in the case light deflection scanning of at least m times are necessary in order for an exposure quantity emitted to the image carrying member to reach a predetermined exposure quantity, wherein if one scan frequency of the light deflection device is set to fv0 (Hz), exposure energy density necessary when exposure is completed across light deflection scanning of m times is set to Ex_fv0 and another scan frequency of the light deflection device is set to fv1 (Hz), exposure energy density necessary when exposure is completed across light deflection scanning of m times is set to Ex_fv1, the exposure energy density of the light scanning apparatus in the case $$fv1 < fv0$$

satisfies the following condition:

$$Ex\_fv1 < Ex\_fv0.$$

* * * * *